United States Patent
Keahey et al.

(10) Patent No.: US 10,325,384 B2
(45) Date of Patent: Jun. 18, 2019

(54) MULTI-ATTRIBUTE RELATION NETWORK VISUALIZATION AND INTERACTION INTERFACE

(71) Applicant: International Business Machines Corporation, Armonk, NY (US)

(72) Inventors: Thomas A. Keahey, Naperville, IL (US); Vanessa V. Michelini, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 14/830,843

(22) Filed: Aug. 20, 2015

(65) Prior Publication Data

US 2017/0054613 A1 Feb. 23, 2017

(51) Int. Cl.
*G06T 11/20* (2006.01)
*G06F 3/0482* (2013.01)
*G06F 3/0484* (2013.01)
*H04L 12/24* (2006.01)

(52) U.S. Cl.
CPC .......... *G06T 11/206* (2013.01); *G06F 3/0482* (2013.01); *G06F 3/04842* (2013.01); *G06F 3/04847* (2013.01); *H04L 41/22* (2013.01); *G06T 2200/24* (2013.01); *H04L 41/12* (2013.01)

(58) Field of Classification Search
CPC ............. G06T 11/206; G06F 17/30699; G06F 17/30864; G06Q 50/01
USPC ........................................................ 715/735
See application file for complete search history.

(56) References Cited

U.S. PATENT DOCUMENTS

| | | | |
|---|---|---|---|
| 5,774,128 A | 6/1998 | Golshani et al. | |
| 9,335,885 B1 * | 5/2016 | Brocato | G06F 3/0481 |
| 2003/0085931 A1 * | 5/2003 | Card | G06F 17/30873 |
| | | | 715/853 |

(Continued)

OTHER PUBLICATIONS

Lindemann, Structural Complexity Management, An Approach for the Field of Product Design, 2009, Springer, pertinent pp. cover page title page, page following the title page, 78, 107-113, 158, 159.*

(Continued)

*Primary Examiner* — Jennifer N To
*Assistant Examiner* — Terri L Filosi
(74) *Attorney, Agent, or Firm* — Stephen J. Walder, Jr.; Diana R. Gerhardt

(57) ABSTRACT

Mechanisms are provided to implement a relation network visualization and interaction engine that is configured to generate an extended adjacency matrix representation of a relation network. The mechanisms create a relation network data structure, and generate an adjacency matrix graphical representation of the relation network based on analysis of the relation network data structure. The mechanisms extend the adjacency matrix graphical representation by adding an interactive indirect relation glyph, for an indirect relation in the relation network, to the adjacency matrix graphical representation in association with representations of a source entity and a target entity that correspond to the indirect relation, to thereby generate an extended adjacency matrix graphical representation. The mechanisms output the extended adjacency matrix graphical representation in a visual manner on a computing device.

16 Claims, 8 Drawing Sheets

(56) References Cited

U.S. PATENT DOCUMENTS

| | | | |
|---|---|---|---|
| 2004/0061702 A1* | 4/2004 | Kincaid | G06F 19/26 345/440 |
| 2005/0237321 A1 | 10/2005 | Young et al. | |
| 2009/0287678 A1 | 11/2009 | Brown et al. | |
| 2011/0066587 A1 | 3/2011 | Ferrucci et al. | |
| 2011/0125734 A1 | 5/2011 | Duboue et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2014/0052736 A1 | 2/2014 | Anderson et al. | |
| 2014/0189559 A1 | 7/2014 | Bleizeffer et al. | |
| 2014/0267294 A1* | 9/2014 | Ma | G06T 11/206 345/440 |

OTHER PUBLICATIONS

"Classification of Objects Based on the ISOMAP Algorithm", IP.com Prior Art Database Technical Disclosure, IP.com No. 000234966, Feb. 10, 2014, 10 pages.

Abdul-Rahman, Alfie et al., "Comparing Three Designs of Macro-Glyphs for Poetry Visualization", Eurographics Conference on Visualization (EuroVis), 2014, pp. 103-107.

Borgo, R et al., "Glyph-based Visualization: Foundations, Design Guidelines, Techniques and Applications", STAR—State of the Art Report, Eurographics 2013/M. Sbert, L. Szirmay-Kalos, 25 pages.

Cava, Ricardo et al., "Glyphs in Matrix Representation of Graphs for Displaying Soccer Games Results", The 1st Workshop on Sports Data Visualization (IEEE VIS 2013), Oct. 13-18, 2013, 4 pages.

Dinkla, Kasper et al., "Compressed Adjacency Matrices: Untangling Gene Regulatory Networks", IEEE Transactions on Visualization and Computer Graphics (vol. 18, Issue 12), Dec. 2012, pp. 2457-2466.

Elmqvist, Niklas et al., "ZAME: Interactive Large-Scale Graph Visualization", IEEE VGTC Pacific Visualization Symposium 2008 (Pacific Asia-Pacific—formerly Asia-Pacific APVIS), Mar. 5-7, 2008, 8 pages.

High, Rob, "The Era of Cognitive Systems: An Inside Look at IBM Watson and How it Works", IBM Corporation, http://ip.com/pdf/redbook/REDP495500.pdf, Dec. 12, 2012, 16 pages.

Internet Society RFCS, et al., "Report from the Smart Object Workshop", IP.com Prior Art Database Technical Disclosure, IP.com No. 000216676, Apr. 13, 2012, 65 pages.

McCord, M.C. et al., "Deep parsing in Watson", IBM J. Res. & Dev. vol. 56 No. 3/4 Paper 3, May/Jul. 2012, pp. 3:1-3:15.

Yuan, Michael J. et al., "Watson and Healthcare, How natural language processing and semantic search could revolutionize clinical decision support", IBM Corporation, developerWorks, http://www.ibm.com/developerworks/industry/library/ind-watson/, Apr. 12, 2011, pp. 1-14.

\* cited by examiner

MULTI-ATTRIBUTE RELATION NETWORK VISUALIZATION AND INTERACTION INTERFACE

BACKGROUND

The present application relates generally to an improved data processing apparatus and method and more specifically to mechanisms for providing a multi-attribute relation network visualization and interaction interface which utilizes a grid-based method of visualization.

Relation networks are commonly encountered in many domains where people need to model the connections between entities to better understand patterns. Such relation networks are typically visualized as a node-link diagram where the objects or entities are represented as points/nodes in the diagram and the relations are represented as lines, or edges, between these points/nodes. This method of visualizing relation networks is intuitive and allows tracing multi-step paths. However, such visualization does not scale well beyond very small examples due to significant overlap and clutter of the visualization as the relation network grows and involves an increasing number of points/nodes and lines/edges. Although work has been done to generate layout algorithms to reduce clutter, the layout issue is a non-deterministic polynomial-time hard (NP-hard) computational problem with no general solutions.

The need for good relation network models is ubiquitous across almost every industry and application, including areas such as financial transaction networks, communications, social network analytics, protein genomics, and the like.

SUMMARY

In one illustrative embodiment, a method is provided, in a data processing system comprising a processor and a memory comprising instructions that specifically configure the processor to implement a relation network visualization and interaction engine, for generating an extended adjacency matrix representation of a relation network. The method comprises receiving, by the relation network visualization and interaction engine implemented by the processor, a relation network data structure, and generating, by the relation network visualization and interaction engine, an adjacency matrix graphical representation of the relation network based on analysis of the relation network data structure. The method further comprises extending, by the relation network visualization and interaction engine, the adjacency matrix graphical representation by adding an interactive indirect relation glyph, for an indirect relation in the relation network, to the adjacency matrix graphical representation in association with representations of a source entity and a target entity that correspond to the indirect relation, to thereby generate an extended adjacency matrix graphical representation. Furthermore, the method comprises outputting, by the relation network visualization and interaction engine, the extended adjacency matrix graphical representation in a visual manner on a computing device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
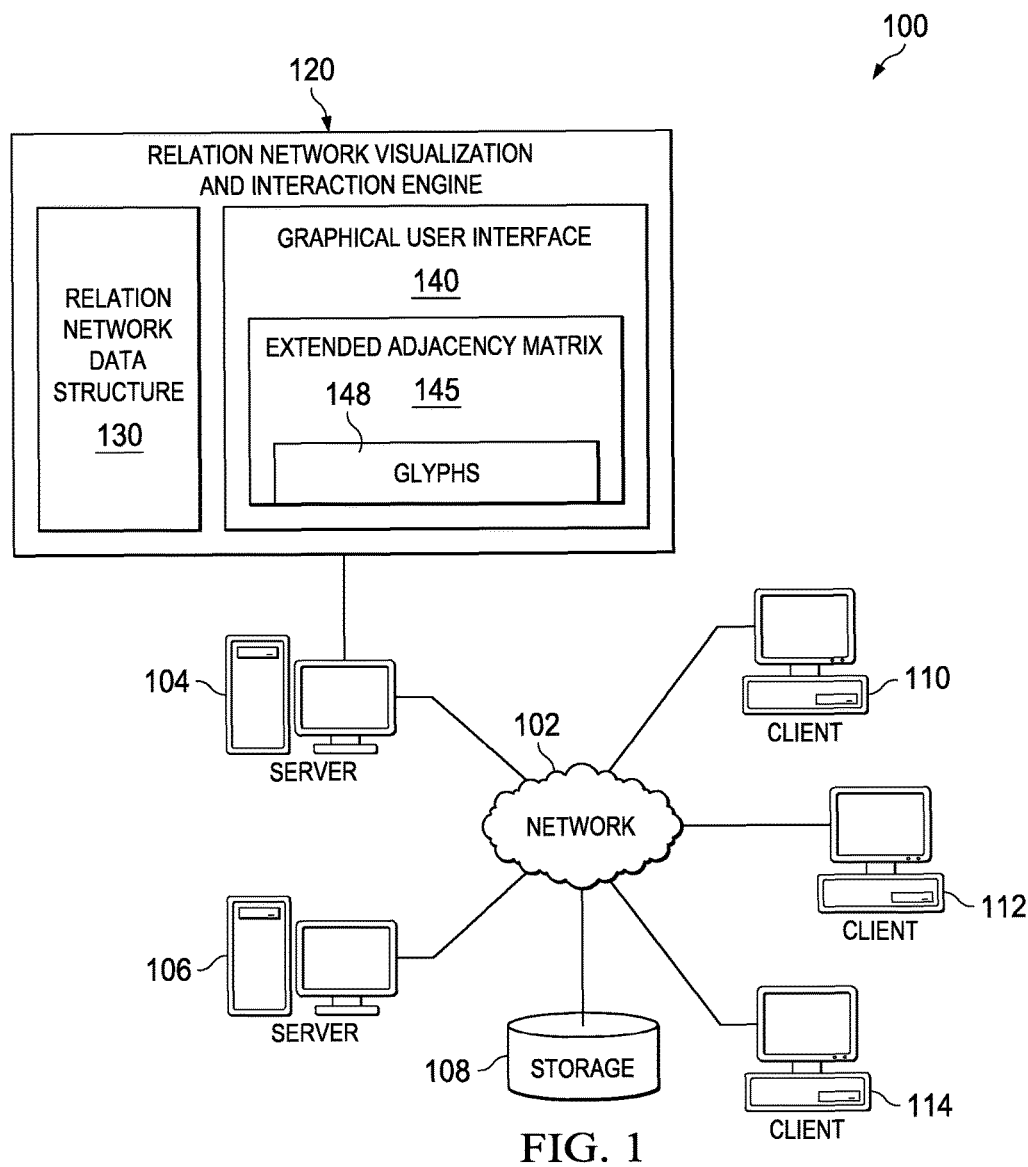
FIG. 1 is an example diagram of a distributed data processing system in which aspects of the illustrative embodiments may be implemented.

The illustrative embodiments provide mechanisms for providing a multi-attribute relation network visualization and interaction interface which utilizes a grid-based method of visualization. The interface of the illustrative embodiments utilizes an enhanced and expanded adjacency matrix to represent a relation network. In an adjacency matrix, the entities of a relation network are represented by portions of row and column headers of a grid with the entry at the intersection of each row/column pair being configured to indicate the presence and nature of the relationship between the two entities, e.g., different coloring, highlighting, font, visualized texturing, or any other type of visual representation of the nature of the relationship can be utilized. An adjacency matrix itself is a matrix that represents which vertices or nodes of a graph are adjacent to which other vertices or nodes. An entry of an adjacency matrix is the number of directed edges from one vertex (row, column) to the other (column, row). For a simple graph, the entries are 0 or 1 depending upon whether the vertices are adjacent or not.

It should be appreciated that the entities represented in the portions of the row/column headers, i.e. the vertices, may be any type of entity for which relationship information is to be depicted, e.g., persons, places, things, events, concepts, and the like. In the examples provided hereafter, the entities will be assumed to be entities in protein genomics including such entities as proteins, drugs, receptors, growth factors, transcription factors, mutations, kinase, complex, and the like. It should be appreciated that these are only examples of entities that may be represented in a relation network visualization and interaction interface of the illustrative embodiments and the illustrative embodiments may be utilized with any entities and any relation types of one or more relation networks without departing from the spirit and scope of the illustrative embodiments.

While adjacency matrices do not have the problem of clutter and overlapping lines that is found in node-link diagram based representations of relation networks, they can only show direct relations between entities, i.e. whether one entity (vertex) is adjacent to another and thus, has a direct relation, and are not able to show indirect relationships or complex multi-step paths. The illustrative embodiments extend and enhance adjacency matrices to permit the representation of multiple step relations, or paths, between entities of the adjacency matrices. In one aspect of the illustrative embodiments, the indirect multi-step relations are represented in an extended adjacency matrix as interactive indirect path glyphs that reflect details about the indirect relations between the source and target entities of the adjacency matrix. In another aspect, the relation network visualization and interaction interface provides mechanisms for interactively expanding the indirect path glyphs to show the details within the path. This may be done via a popup representation, expanding the adjacency matrix to include the additional details, or any other suitable graphical representation for expanding the details of the indirect path glyphs. In yet another aspect of the illustrative embodiments, the extended adjacency matrix is interactively coupled to a sub-matrix that represents subsequent relations for a selected subset of entities from the adjacency matrix. Multiple sub-matrices may be chained together in this manner to show increasingly longer paths through the relation network. These and other aspects will be described in greater detail hereafter.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the illustrative embodiments provide a mechanism for representing and interacting with a relation network to obtain information about the interconnections and relationships between entities of the relation network. The illustrative embodiments provide an interface that represents the relation network as an extended adjacency matrix that represents not only direct relations between entities of the relation network but also indirect, multi-step, paths between entities. The representation of these indirect, multi-step, paths is provided such that a user is able to select such indirect paths and obtain an expanded view of the indirect path with more detailed representations of the actual steps along the indirect paths from one entity to another.

Figure 2:
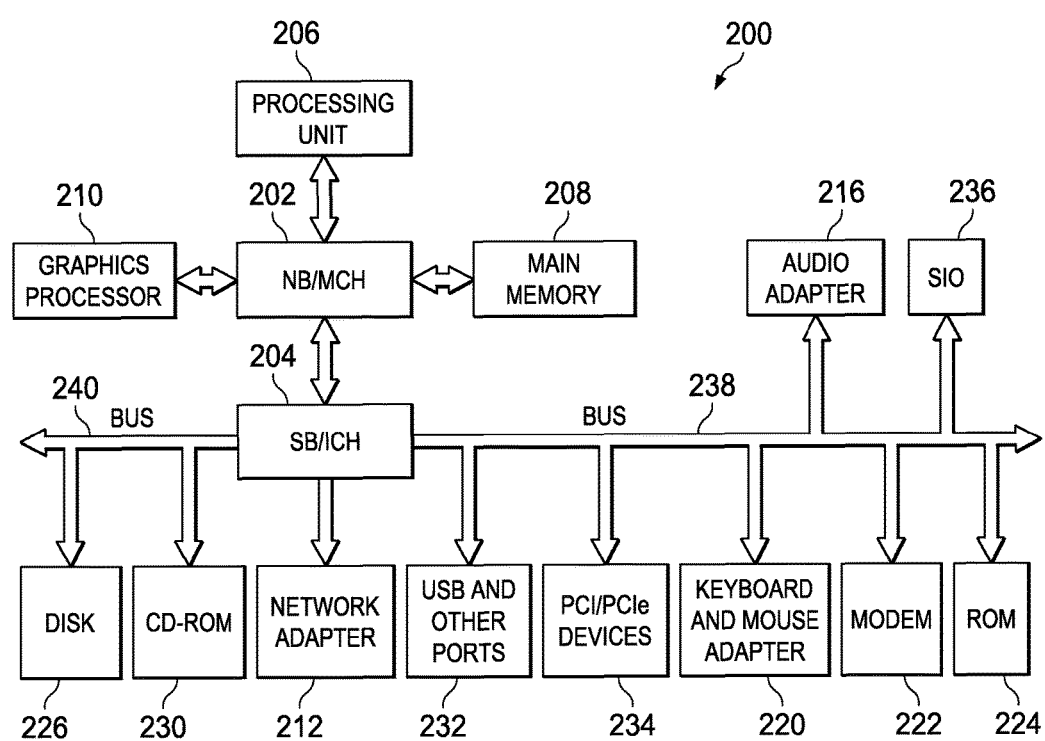
FIG. 2 is an example block diagram of a computing device in which aspects of the illustrative embodiments may be implemented.

Thus, it can be appreciated that the illustrative embodiments may be utilized in many different types of data processing environments in which relation networks are visualized. Such data processing environments may comprise one or more computing devices providing hardware and software resources for various domains including, but not limited to, financial transaction networks, communication networks, social network analytics, protein genomics, and the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, client 110, or the like, may be specifically configured to implement a relation network visualization and interaction engine 120. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates the extraction of relation network information for purposes of understanding patterns of relationships between entities in a complex relation network.

The relation network visualization and interaction engine 120, also referred to as the "engine 120", provides hardware and/or software logic that operates to process a relation network data structure 130, also referred to as "relation data 130", to generate a relation network visualization and interaction graphical user interface (GUI) 140 that is output to a user, such as via a client computing device 110. The relation network visualization and interaction GUI 140 comprises a graphical representation of the relation network data structure 130 as a multi-dimensional extended adjacency matrix 145 which includes interactive indirect path glyph data structure representations 148. The interactive indirect path glyph data structure representations 148, or glyphs 148, are selectable to expand the glyph 148 to show the details of the indirect path from a source entity to a destination entity of the indirect path. Moreover, the extended adjacency matrix 145 is further configured for selection of a source and destination entity pair such that a sub-matrix corresponding to the source and entity pair may be visually represented as a separate sub-matrix or as an extension of the extended adjacency matrix 145 itself. These representations and interactions will be described in greater detail hereafter with regard to subsequent figures.

In some illustrative embodiments, rather than implementing the relation network visualization and interaction engine 120 on a server computing device, aspects of the engine 120 may be implemented in a client computing device, such as a client 110, for example. In such an embodiment, the GUI 140, extended adjacency matrix 145, and glyphs 148, are all implemented on a client computing device 110, including the logic of the relation network visualization and interaction engine 120 for controlling the operations performed to process the data and generate the multi-dimensional extended adjacency matrix 145 with the included interactive indirect path glyph data structure representations 148. For example, a server, such as server 106, may send the relation data 130 to the client computing device 110, possibly with code for implementing the network visualization and interaction engine 120 on the client computing device 110 if the code is not already present on the client computing device 110, which drives the GUI 140 and the processing, generation, and output of the GUI 140 with the multi-dimensional extended adjacency matrix 145 having the glyphs 148.

It should be appreciated that the illustrative embodiments operate on a relation network data structure 130 that is provided to the relation network visualization and interaction engine 120, or otherwise generated by the relation network visualization and interaction engine 120 using known mechanisms. That is, it is assumed for purposes of this description that the data that serves as a basis for the generation of the extended adjacency matrix 145, the glyphs 148, and other aspects of the graphical user interface 140 is obtained through known mechanisms. In one illustrative embodiment, the relation network data structure 130 may be obtained from a server 106, network attached storage 108, or other computing device coupled to the network 102 and may represent plurality of entities and their relationships.

The relation network data structure 130 that is provided to, or otherwise generated by, the relation network visualization and interaction engine 120 is processed by the relation network visualization and interaction engine 120 to generate the extended adjacency matrix 145. The logic of the relation network visualization and interaction engine 120 performs various analyses of the relation network data structure 130 to extract the relationships between entities, the characteristics of these relationships, and the like. The relationships comprise both direct relationships and indirect relationships, which are essentially chains of direct relationships between one entity and another via one or more intermediate entities. In particular, between any two entities in the relation network data structure 130, a determination is made as to whether there is a direct relationship and if so, the type of relationship, actions associated with the relationships, and any other domain specific characteristics of the relationships. If there is no direct relationship between the two entities, analysis is performed to determine if there is an indirect relationship between the two entities via one or more intermediate entities. Such analysis may involve identifying the direct relationships of the entities with other entities, identifying the direct relationships of the other entities with still other entities, and so on until a common intermediate entity is found that links the paths from one entity to the paths to the second entity. The indirect paths found in this manner may then be stored in association with the particular source and target entities of the path. This is but one way to find indirect paths between entities. Any suitable mechanism for identifying indirect paths may be used without departing from the spirit and scope of the illustrative embodiments.

As discussed in greater detail hereafter, the extended adjacency matrix generated by the mechanisms of the illustrative embodiments comprises row and column headers that correspond to the entities specified in the relation network data structure and entries in the matrix represent the types of relationships between the entities. Additional elements specific to the illustrative embodiments for presenting interactive indirect path glyphs 148 and interface elements for generating sub-matrix representations based on selections of entities are also provided as described hereafter.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the relation network visualization and interaction engine.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As stated above, the illustrative embodiments provide a relation network visualization and interaction engine 120 that operates to generate a graphical user interface 140 that includes an extended adjacency matrix 145. The extended adjacency matrix 145 comprises a number of aspects specific to the illustrative embodiments including the representation of indirect multi-step paths from one entity to another as interactive indirect path glyphs 148. These glyphs 148 may be expanded to show the details of an indirect path 148 including additional representations of specific types of relationships between intermediate entities along the indirect path. Moreover, the aspects further include the ability to generate sub-matrices based on the selection of a plurality of entities in the main extended adjacency matrix 145. All of these functionalities permit users to obtain detailed information about relation network relationships between entities in a clutter-free representation which facilitates the viewer tracing indirect multi-step paths through the relation network.

Figure 3:
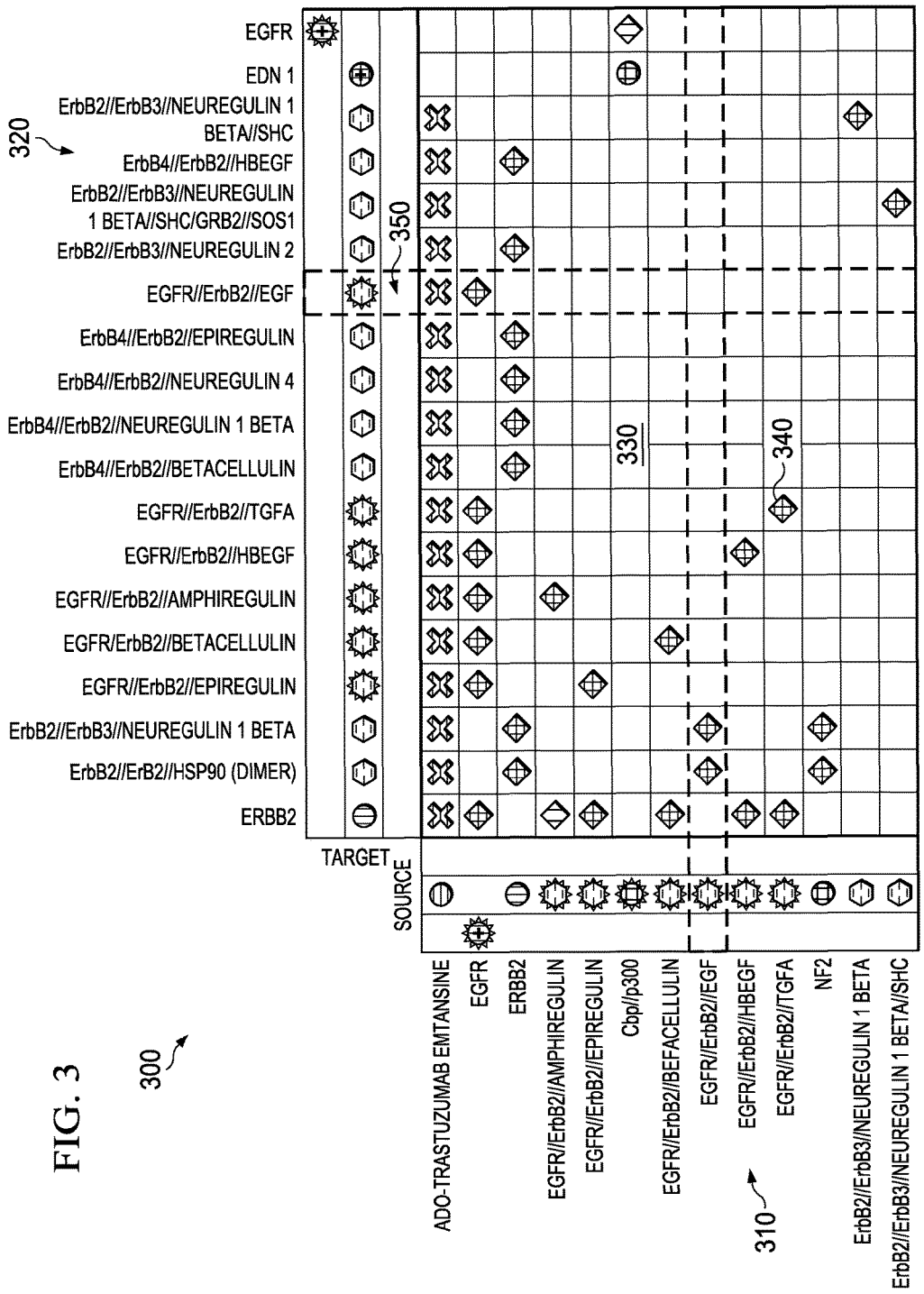
FIG. 3 is an example diagram of an extended adjacency matrix representation of a relation network in accordance with one illustrative embodiment.

FIG. 3 is an example diagram of an extended adjacency matrix graphical user interface (GUI) 300 (hereafter referred to simply as the extended adjacency matrix 300) which includes a representation of a relation network in accordance with one illustrative embodiment. As shown in FIG. 3, the network entities specified in a relation network data structure 130 are identified as elements in portions of the row 310 and column 320 headers of the extended adjacency matrix 300. In the depicted example, entities that have outgoing relations are placed as row entry headers 310 corresponding to source entities. Entities that have incoming relations are placed as column headers 320 corresponding to target entities. Thus, each column corresponds to a target entity and each row corresponds to a source entity.

The header portions 310 and 320 are extended by the mechanisms of the illustrative embodiments to represent different levels or categories of information within each header 310, 320. One example of this extension of the headers 310, 320 to represent multiple levels or categories of information is shown in FIG. 3 as relations in a protein genomics network and includes a membrane level of information, cytoplasm level of information, and a nucleus level of information for both the source and target entities. It should be appreciated that any categories associated with entities may be used to define the row and column headers 310, 320. In the depicted example, the categories correspond to regions of a cell because they are of importance to an implementation of the illustrative embodiments to the protein genomics field. However, in another implementation, different categories may be represented in the headers 310, 320 without departing from the spirit and scope of the present invention, e.g., when looking at sales figures for a national company, the row and column header categories could be set to various sales regions of interest.

Glyphs may be provided and placed in appropriate rows or columns of the headers to indicate a corresponding entity type, value, or the like, for that category of information. For example, as shown in FIG. 3, different glyphs may be provided for different types of entities and the corresponding glyph may be placed in a row or column of the headers 310, 320 corresponding to the level of information that corresponds to that type of entity, e.g., cell location, drug type entity, receptor type entity, complex type entity, etc. Alternatively, a header 310, 320 may be provided that represents continuous spectrum of values where the positioning of the glyph within the header 310, 320 lower or higher within the header region is proportional to a value of a category of information on the continuous spectrum.

Figure 4A:
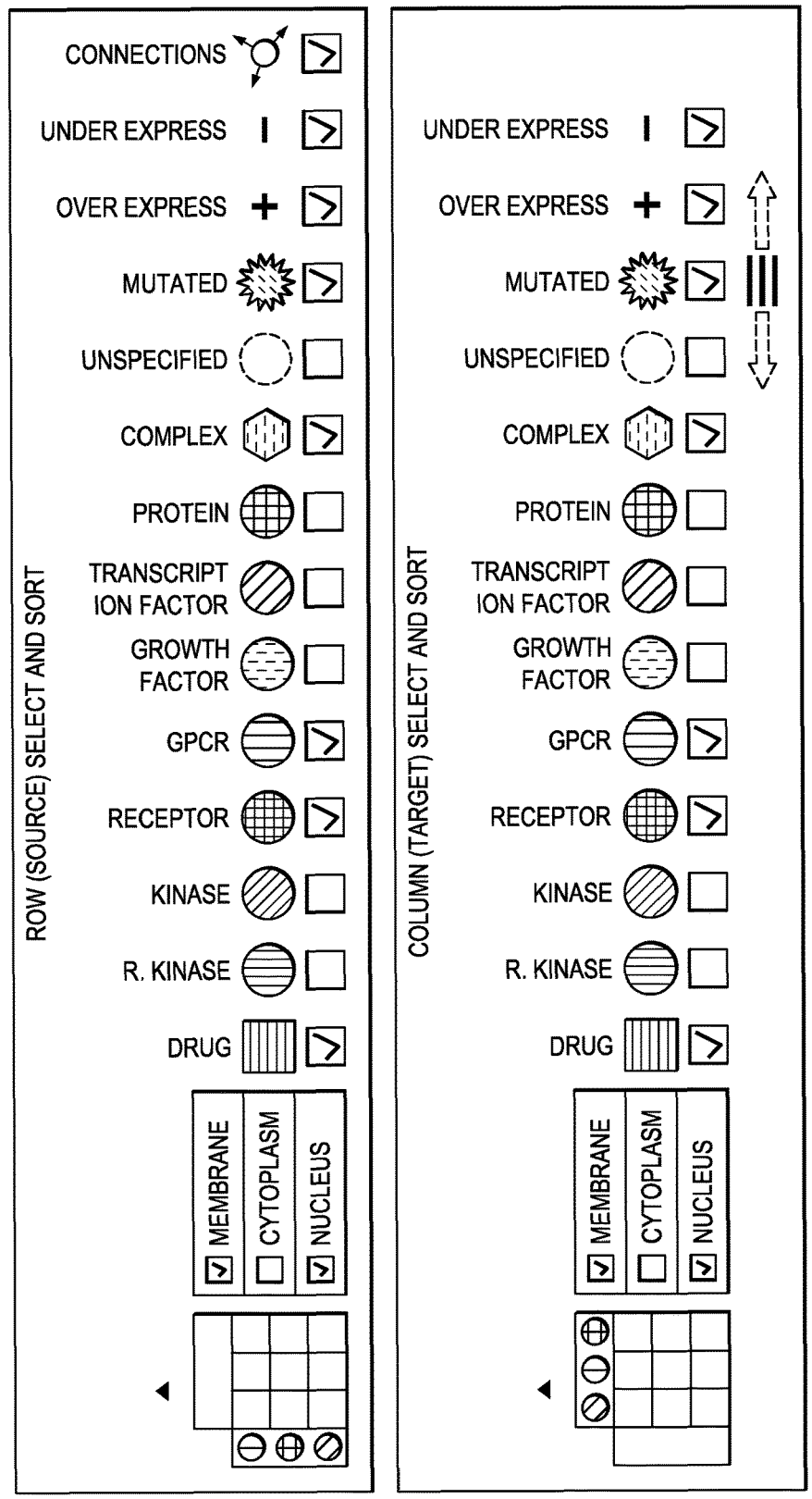
FIG. 4A is an example diagram of a legend for row and column headers of an extended adjacency matrix in accordance with one illustrative embodiment.

In the depicted example, in the depiction in FIG. 3, various glyphs in the header columns and rows 310, 320 indicate the cell location of the particular entity while the glyph itself indicates the type of entity as discussed herein with regard to FIG. 4A. For example, the glyph in FIG. 3 corresponding to the entity "EGFR" has a dot representing the entity, which is a gene in this case, to be located in the cell membrane, and the gene is of a type "kinase" (as shown in FIG. 4A). Moreover, the jagged star portion of the glyph indicates that the gene has mutated and the "+" symbol indicates the level of expression, i.e. whether it is being created more or less than a usual or expected amount (see the legend shown in FIG. 4A). Thus, a complex glyph comprising various levels of information is provided which, in combination with its location within the various categories of the column and/or row headers 310, 320, provides a deep level of information that is readily understandable to the user.

Figure 4B:
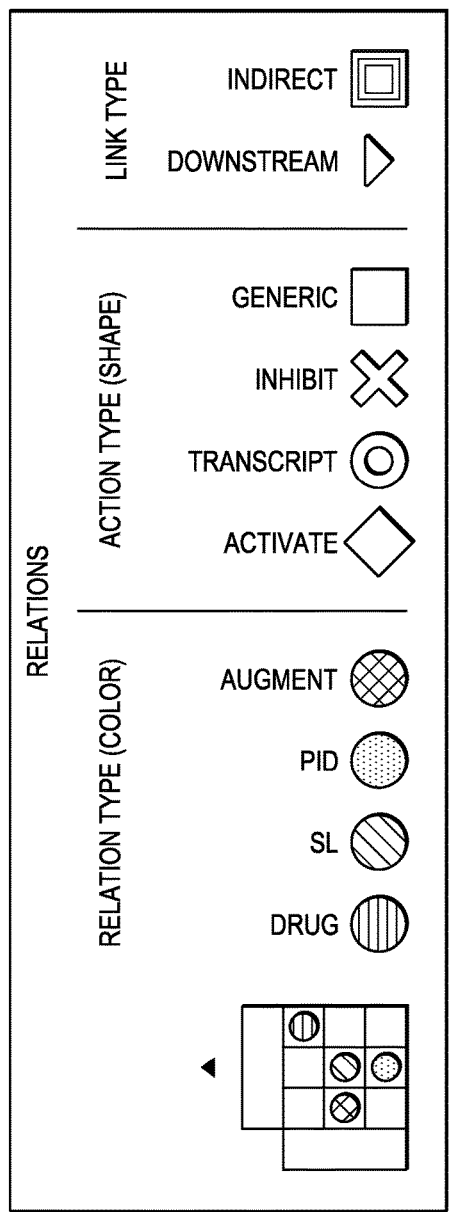
FIG. 4B is an example diagram of a legend for interactive indirect path glyphs in accordance with one illustrative embodiment.

Within the body 330 of the extended adjacency matrix 300, glyphs 340 are provided at intersections of rows and columns to indicate that there is a relation between the source and target entities corresponding to the rows and columns. These glyphs may be represented as various shapes or other graphical representations having various colors, sizes, patterns, and the like, to represent rich information about the particular relationship. The particular glyphs 340 to be placed at the various intersections are determined based on an analysis of the relation network data structure to identify the various relationships specified in the relation network data structure between entities, and an established glyph set. The glyph sets for one illustrative embodiment are depicted in FIGS. 4A and 4B. Glyphs 340 may be superimposed over one another so as to represent multiple aspects of an entity or relationship, e.g., a glyph directed to representing a "mutated entity" may have a second glyph associated with a "complex" entity being superimposed over the mutated glyph to form a representation of an entity that indicates an entity that is both a complex and a mutation. Similar techniques of combining glyphs can be used to show multiple properties of relations within the adjacency matrix.

Thus, for example, using the complex glyph for the entity "EGFR" mentioned above and shown in FIG. 3, the glyphs 340 in the body 330 indicate that the gene "EGFR" has seven direct connections, represented by the diamond glyphs in the body 330, in the row corresponding to the glyph for the "EGFR" entity. Each of these direct connections are connected to entities (e.g., genes) that are located in the cell cytoplasm, as indicated by the glyphs in the column header 320 which are located in the middle row of the column header 320 corresponding to the cell cytoplasm.

The source and target headers 310, 320 can be independently or jointly manipulated via sorting, selection and filtering, as may be initiated based on user input to the GUI 140. This allows the user to move entities of greatest interest to a more prominent portion of the extended adjacency matrix 300 for inspection. For example, a user may move entities of greatest interest up and to the left in the matrix 300 so that they are more easily viewed, especially in the case of a complex relation network having hundreds or thousands of entities. Entities that are not of as much interest, e.g., those that have no relationships with other entities, can be filtered from the matrix 300 entirely and the matrix 300 representation can be compressed to remove empty rows and columns to provide a more compact representation of the relation network and the relationships between entities in the relation network.

The extended adjacency matrix 300 as described thus far can be used to visualize all of the entities and their direct relations in a relation network. In addition, the extended adjacency matrix 300 is further augmented and extended to provide functionality for representing indirect relations that come from chaining multiple direct relations, e.g., a path of entity A to entity B to entity C gives an indirect relation between entities A and C. These extensions or augmentations include the representation of such indirect relations as specialized interactive indirect path glyphs 350 that are indicative of one or more levels of indirection between the source and the target entities of the particular intersection in the body of the extended adjacency matrix 300. The interactive indirect path glyphs 350 may be a superimposed set of glyphs representing a plurality of direct paths, and the types of relations of these direct paths, that together make up the indirect path represented by the interactive indirect path glyph 350. Alternatively, the interactive indirect path glyphs 350 may be specialized symbols that merely generally identify an indirect path.

Figure 4C:
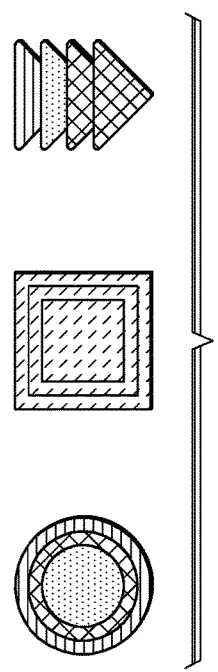
FIG. 4C is an example diagram illustrating example interactive indirect path glyphs in accordance with one illustrative embodiment.

In addition to new interactive indirect path glyphs, such as the indirect path glyph 350 in FIG. 3, the alternative glyphs shown in FIG. 4C, or the like, the extended adjacency matrix 300 is further augmented to include target highlighting functionalities. That is, when a user selects a particular source entity using the GUI 140, the connected target entities are automatically highlighted to show the direct relationships between the source entity and target entities. In addition to highlighting the direct relations, the indirect relations may also be automatically identified and highlighted using a different highlighting visualization than that of the direct relations, alternative color highlighting, blink rates, or any other visualization characteristic that may conspicuously identify the indirect relations from the direct relations. In one implementation, direct relations may be represented with a prominent color while the indirect relations may be represented with gradually lighter colorings with each successive path distance, e.g., as the number of intermediate paths between the source and the target entities increases, the coloring of the highlighting of the target and corresponding glyphs is made gradually lighter.

Moreover, different levels of indirection may be represented with different types of highlighting, e.g., different colors or the like. For example, indirect relations having 2 intermediate paths between the source and target entities may be represented in one color while indirect relations having 3 or more intermediate paths may be represented in a different color highlighting. Separate highlighting characteristics may be provided for each category of level of indirection desired.

In addition to the augmentations described above, the extended adjacency matrix 300 further includes functionality to respond to a user input to select an interactive indirect path glyph by expanding the representation of the indirect path to depict the entire path from the source entity to the target entity corresponding to the selected interactive indirect path glyph 350, including the intermediate paths and intermediate entities. Each of the intermediate paths are direct paths between two entities that, when combined together generate a chain of direct paths that link the source entity to the target entity. Each intermediate entity is represented by its corresponding glyph representing the entity type and each intermediate direct path is represented by its corresponding glyph representing the path type(s). Thus, in places of the extended adjacency matrix 300 where an interactive indirect path glyph 350, the extended adjacency matrix 300 provides functionality for visually representing the full path of the indirect path using the same glyphs as used in the overall main extended adjacency matrix 300. The representation of the entire path corresponding to the indirect path may be provided as a popover view or an automated expansion of the extended adjacency matrix 300 to include an additional row or column may be provided to specifically depict the detailed view of the indirect path.

As yet another augmentation to the extended adjacency matrix 300, functionality is provided in the extended adjacency matrix 300 to the main extended adjacency matrix 300 may be linked to or connected with one or more sub-matrices which in turn may be connected to one or more sub-sub-matrices, etc. For example, in response to selecting a source entity, each of the target entities having direct relations with the source entity may be highlighted. In response to a user input requesting a sub-matrix corresponding to the related target entities to be generated, a sub-matrix connected or linked to the higher level extended adjacency matrix may be generated and output. In this sub-matrix, the target entities of the higher level extended adjacency matrix 300 are shown as the source entities and the other entities that these target (now source) entities have direct relationships with may be shown as target entities in this sub-matrix. Of course, the original source entity may be eliminated from this sub-matrix if necessary to avoid recursiveness in the connected matrices. This same process may then be repeated with regard to the sub-matrix to generate a sub-sub-matrix, and so on, for any number of steps or links along paths between entities. Of course this representation may be customized to particular selected target entities rather than all target entities having a direct relation with a source entity. In some illustrative embodiments, extended paths traversing each of the matrices may be highlighted using a highlight visualization so that a path from one matrix to the other may be easily identifiable, e.g., entity A is highlighted as having a direct relation to entity B in the main extended adjacency matrix 300, entity B is shown in a sub-matrix to have a direct relationship with entity C using this same highlighting, and in a sub-sub-matrix entity C is shown as having a direct relationship with entity D using this same highlighting, thereby illustrating across the matrix and connected sub-matrices the indirect path going from entity A to entity D.

Thus, the illustrative embodiments provide mechanisms for representing complex relation networks in a non-cluttered manner such that indirect paths between entities of the relation network are easily identifiable and expandable. The mechanisms of the illustrative embodiments facilitate ease of access to complex information to allow users to ascertain both direct and indirect relationships between entities of a relation network without having to navigate complex representations in which details are obscured by the complexity of the representation. The details of indirect paths between entities are easily obtained and displayed in an intuitive and user friendly manner with the mechanisms of the illustrative embodiments.

FIG. 4A is an example diagram of a legend for row and column headers of an extended adjacency matrix in accordance with one illustrative embodiment. The glyphs shown in the legends in FIG. 4A represent one example implementation of glyphs for representing different types of entities associated with protein genomics in an extended adjacency matrix in accordance with one illustrative embodiment. In the legends of FIG. 4A, checkboxes are provided, although these are not necessary to the present invention, to allow users to select the particular types of entities that are of interest to the user for depiction within the extended adjacency matrix. Based on the selected entity types, corresponding glyphs for those entities are shown in the representation of the extended adjacency matrix 300 while the non-selected entity types are filtered out of the representation of the extended adjacency matrix 300. To summarize the legend in FIG. 4A, an entity can be a drug (square), a gene (circle) of various types, or a complex of genes (hexagon). If the entity is a gene or complex of genes, the entity can also be assigned visual properties indicating the level of expression (+ or −) and mutation status (jagged star).

FIG. 4B is an example diagram of a legend for interactive indirect path glyphs in accordance with one illustrative embodiment. The glyphs shown in FIG. 4B represent the relationships between entities and are indicative of the types of these relationships, e.g., drug, SL, PID, augment. The relations shown in the depiction in FIG. 4B are for an example implementation directed to protein genomics. In the depicted example, each relation in the genomics network has a type of relation, e.g., drug, synthetic lethality (SL), PID, or Augment, and an action, e.g., the type of relation is that one entity either enhances production or inhibits production of the other entity (target entity).

The glyphs further include glyphs to identify relationships as either direct or indirect. Thus, with the use of the glyphs, and combinations of these glyphs, as shown in FIG. 4B, different types of direct and indirect paths between entities in the extended adjacency matrix may be represented.

FIG. 4C is an example diagram illustrating example interactive indirect path glyphs that may be utilized in accordance with one illustrative embodiment. The examples shown in FIG. 4C illustrate just a few ways in which multi-level glyphs may be utilized to represent multiple levels or steps of indirect paths between entities. The glyphs in FIG. 4C utilize multiple geometrical shapes superimposed one over the other. Each geometrical shape may represent a different level or step of the indirect path and may be color coded or otherwise shaded to represent the corresponding direct path that is a component of the indirect path. Thus, for example, the center circle of a series of overlapped circles may have a coloring to represent the first direct path between the source entity and a first intermediate entity. A ring around this center circle, which in fact may be a circle visually behind the center circle, may represent the second direct path from the first intermediate entity to a second intermediate entity and may have the corresponding coloring or shading corresponding to the type of direct relationship. This process continues until the outer-most ring represents the last direct path between a final intermediate entity and the target entity. Similar visualizations are possible with the rectangles and triangle combinations shown in FIG. 4C. Of course other graphical representations of interactive indirect relation glyphs may be used without departing from the spirit and scope of the illustrative embodiments.

Figure 5:
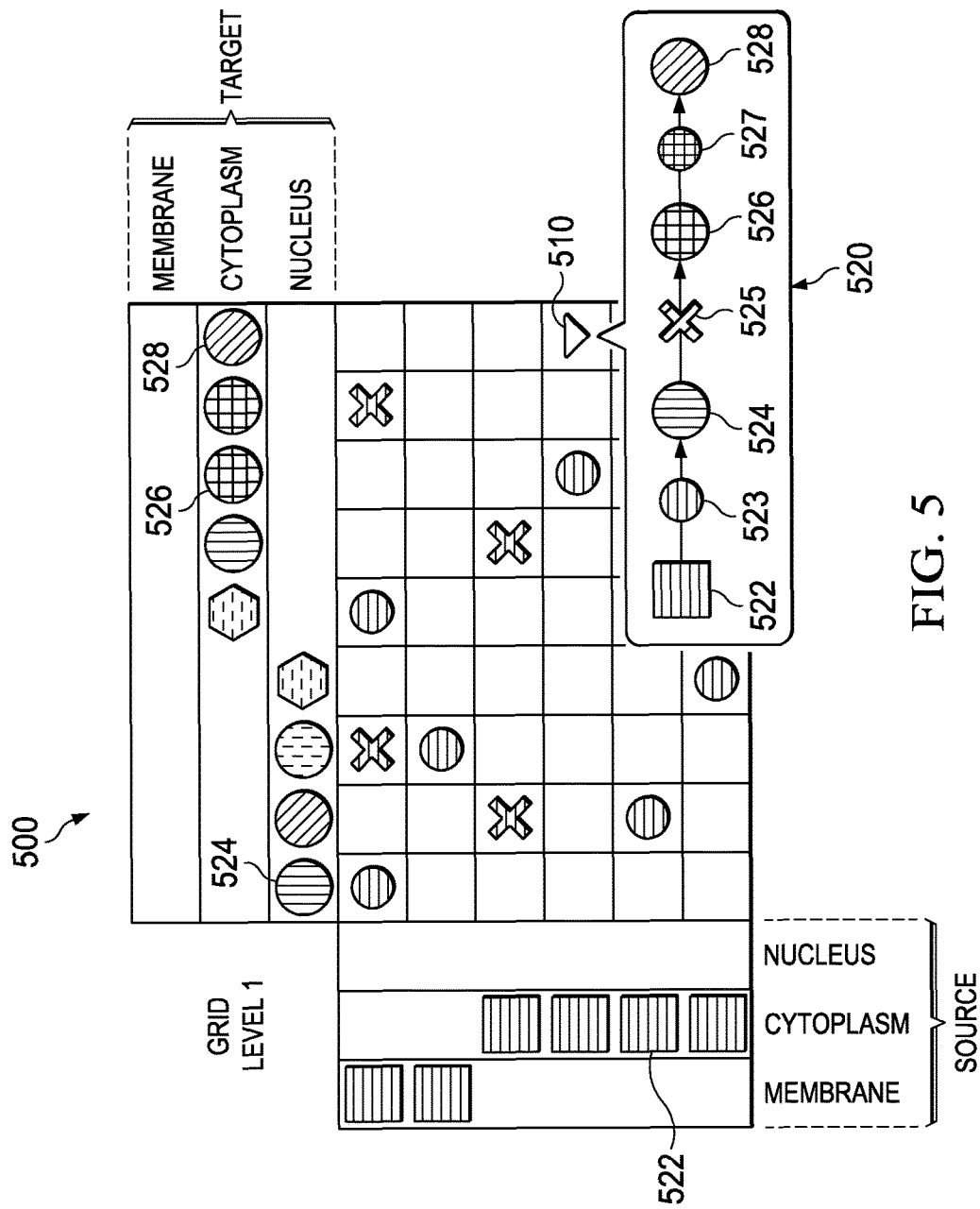
FIG. 5 is an example diagram illustrating a portion of an extended adjacency matrix representation and an expansion of an interactive indirect path glyph in accordance with one illustrative embodiment.

FIG. 5 is an example diagram illustrating a portion of an extended adjacency matrix representation and an expansion of an interactive indirect path glyph in accordance with one illustrative embodiment. The portion of the extended adjacency matrix representation 500 shown in FIG. 5 may be a portion of the main extended adjacency matrix representation, a portion of a sub-matrix, sub-sub-matrix, or the like, such as with regard to the sub-matrices described in the context of FIG. 6 hereafter, for example. In some cases, the extended detail for the indirect path glyph may be independent of the sub-matrices, such as in the case where a pre-processing operation is performed to compute the indirect paths and store these paths for each associated row/column combination in the adjacency matrix. As shown in FIG. 5, the portion of the extended adjacency matrix representation 500 includes an interactive indirect path glyph 510 which is user selectable via the GUI, e.g., GUI 140 which includes the extended adjacency matrix representation 500 and provides the GUI tools and objects for interacting with the extended adjacency matrix representation 500.

In the depicted example, the interactive indirect path glyph 510 represents a larger path having multiple levels, steps, or links of direct paths from a source entity 522 to a target entity 528. In the depicted example, the glyph 510 uses a single level specialized glyph rather than the graphical multi-level glyphs shown in FIG. 4C and thus, only a single triangular glyph 510 is shown.

In response to a user selecting the interactive indirect path glyph 510, the extended adjacency matrix representation 500 is dynamically modified to output a detailed representation of the entire indirect path from the corresponding source entity 522 to the target entity 528 as an expanded view 520. In the depicted example, the expanded view 520 is shown as a popover view 520, however the illustrative embodiments are not limited to such. Rather, the expanded view 520 may be provided in any suitable manner to the particular implementation including automatic expansion of the rows and/or columns of the extended adjacency matrix representation 500 to include an additional row/column for inclusion of the full path expanded view 520, generation of an additional window or other graphical output on the desktop of the computing device rendering the extended adjacency matrix representation 500, in which the expanded view 520 is provided, or the like.

The expanded view 520 comprises a graphical representation of each direct relation between each entity along the indirect path from the source entity 522 to the target entity 528. Thus, as shown in FIG. 5, the expanded view 520 shows a chain of direct relations comprising a first intermediate direct relation 523 from the source entity 522 to a first intermediate entity 524, a second intermediate direct relation 525 from the first intermediate entity 524 to a second intermediate entity 526, and a third intermediate direct relation 527 from the second intermediate entity 526 to the target entity 528. It should be noted that the glyphs associated with each of the entities 522, 524, 526, and 528 correspond to the types of entities and their glyphs specified in the extended adjacency matrix representation 500. Moreover, each of the intermediate direct relations 523, 525, 527 have glyphs associated with them to represent the types of relations between the connected entities of that particular direct relation.

By providing the detailed expanded view 520 in response to a user interaction with the interactive indirect path glyph 510, the user is provided a more detailed understanding of the relationship between the source and target entities. For example, in a genomics application of the illustrative embodiments, when looking for a drug that can target a particular gene, pathologists often look for an indirect relation. A drug can target a gene (A) that promotes or inhibits another gene (B) that in turn promotes or inhibits the target gene (C) that is to be treated. As another example, in a social networking application of the illustrative embodiments, in order to find a relation between two people, one can expand the indirect relations to show the sequence of direct relations that connect the two people. The mechanisms of the illustrative embodiments, in either application, provide a visual representation that is able to be easily understood and provides a detailed understanding of the relationships between entities in question.

Figure 6:
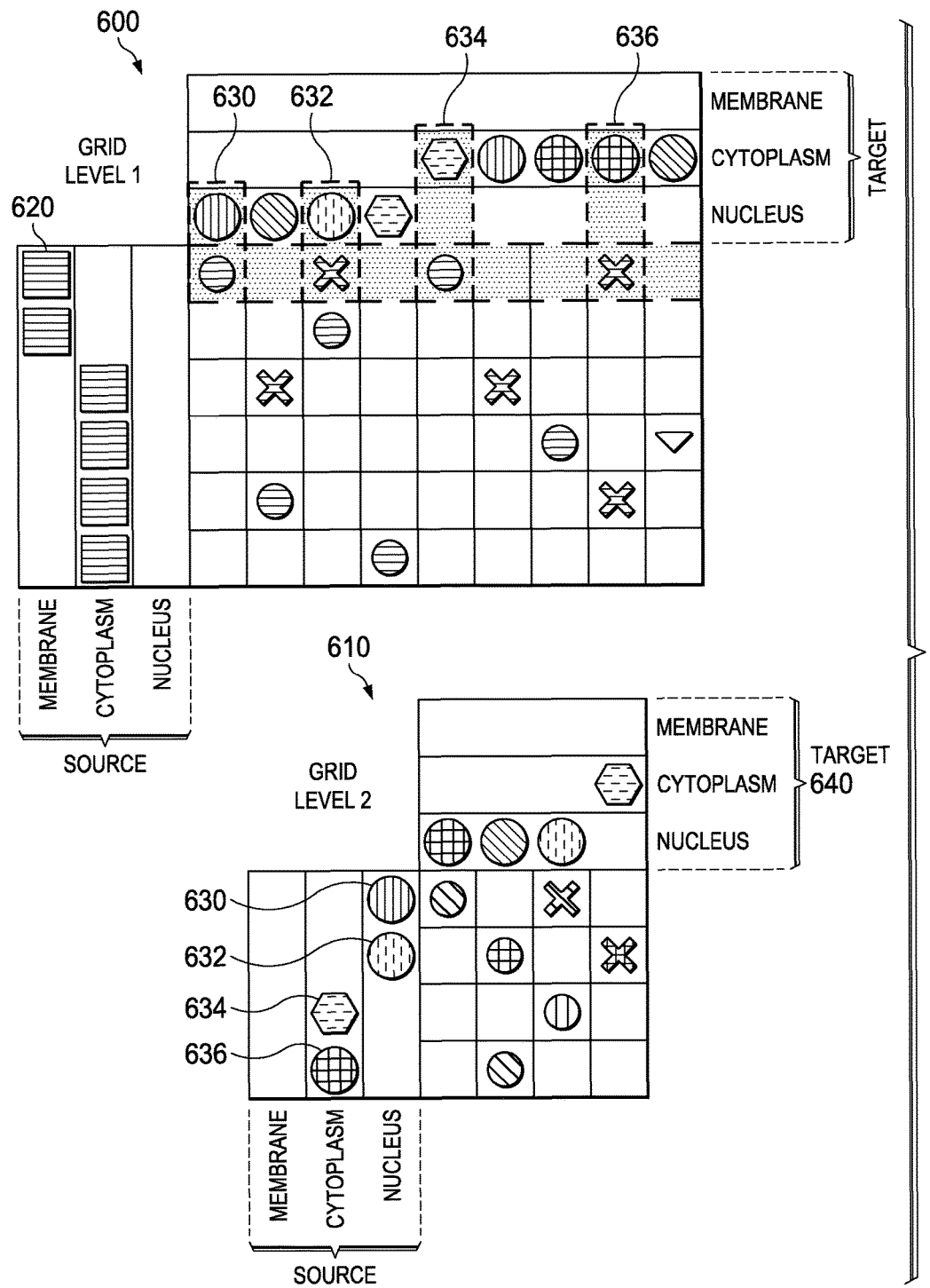
FIG. 6 is an example diagram illustrating a portion of an extended adjacency matrix representation and a connected sub-matrix in accordance with one illustrative embodiment.

FIG. 6 is an example diagram illustrating a portion of an extended adjacency matrix representation 600 and a connected sub-matrix 610 in accordance with one illustrative embodiment. As shown in FIG. 6, in response to a user selecting a source entity 620 in the extended adjacency matrix representation 600, the target entities 630-636 with which the selected source entity 620 has a direct relation may be highlighted. Thereafter, automatically, or in response to a subsequent user input to the GUI to request the creation of a sub-matrix, a connected sub-matrix 610 may be generated to represent the direct relations of the target entities 630-636 with other entities at a next level of relations that are indirect to the selected source entity 620. That is, as shown in FIG. 6, the target entities 630-636 in the extended adjacency matrix representation 600 become the source entities in the "Level 2 Grid" or sub-matrix 610 and are shown as rows in this sub-matrix 610. Other entities with which these target (now source) entities 630-636 have direct relations are represented in the column header 640 of the sub-matrix and corresponding glyphs for the particular types of direct relations are added to the body of the sub-matrix at the appropriate intersections of columns and rows.

This process may be repeated, e.g., a target (now source) entity 630-636 in the sub-matrix 610 may be selected, e.g., entity 632, and the corresponding target entities in the sub-matrix 610 may be highlighted and used to generate a "Level 3 Grid" or sub-sub-matrix that shows the direct relations between these target entities and a third level of other entities. The resulting series of connected matrices may be displayed together on the computing device as a series, in separate windows, or any other suitable manner for facilitating viewing by a user for understanding of the complete paths from the original selected source entity 620 to entities at various levels of indirection.

The same highlighting of target entities may be maintained from one connected matrix to another so as to facilitate ease of identification of these connected entities. For example, a user may select an entity from one of the connected matrices and paths to/from the selected entity may be highlighted across all of the connected matrices using a common highlighting style. Moreover, the connected sub-matrices, as well as the highlighted entities, may be dynamically updated automatically as the user changes selections in one or more of these sub-matrices, i.e. changes a selection of a source entity. Thus, through the use of connected sub-matrices, the user is given a graphical representation of the multiple levels of indirect relations between a selected source entity 620 and various other entities along a plurality of indirect paths from the source entity 620 to various target entities.

Figure 7:
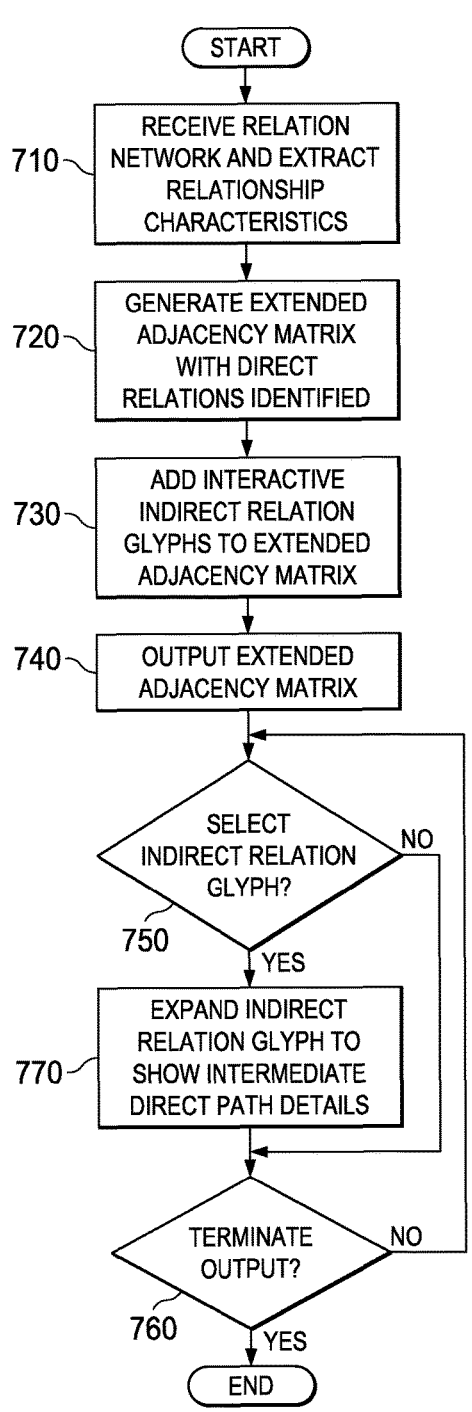
FIG. 7 is a flowchart outlining an example operation for generating an extended adjacency matrix having expandable interactive indirect path glyphs in accordance with one illustrative embodiment.

FIG. 7 is a flowchart outlining an example operation for generating an extended adjacency matrix having expandable interactive indirect path glyphs in accordance with one illustrative embodiment. The operation outlined in FIG. 7 may be implemented using the logic of the relation network visualization and interaction engine 120 in FIG. 1, for example, utilizing the generated graphical user interface 140 which may be output to a user via a computing device, e.g., a client computing device 110-114 in FIG. 1.

As shown in FIG. 7, the operation starts by receiving a relation network and extracting relationship characteristics from the relation network (step 710). For example, the relation network provides data that indicates the various entities and their direct relationships, the types of these relationships, and other characteristics regarding the relationships. This data may be further analyzed to identify chains of direct relationships which together constitute indirect relationships between source and target entities. The results of the relationship characteristics extraction provides the data that is the basis for generating the extended adjacency matrix by identifying entities for inclusion in the headers of the matrix, identifying direct relationships for which glyphs of the particular relationship type are provided in the body of the matrix, and identifying indirect relationships for which glyphs of the particular level and type of indirect relationships are provided in the body of the matrix.

The extended adjacency matrix is generated with the direct relations identified based on the results of the extraction of the relationship characteristics (step 720). Thereafter, interactive indirect relation glyphs are added to the extended adjacency matrix in the portions of the body of the matrix corresponding to the entities connected by the indirect relations identified through the extraction of the relationship characteristics (step 730). The resulting extended adjacency matrix is then output as part of a GUI representing the relation network as the extended adjacency matrix (step 740).

A determination is made as to whether an indirect relation glyph is selected by a user via the GUI (step 750). If not, the operation then determines if the output of the relation network as the extended adjacency matrix is to be terminated (step 760). If so, the operation terminates. If not, the operation returns to step 750 and continues to monitor for the selection of an indirect relation glyph. If an interactive indirect relation glyph is selected by a user, then the indirect relation corresponding to the selected interactive indirect relation glyph is expanded to show the intermediate direct path details of the indirect relation (step 770). This expansion may be as shown in FIG. 5, for example. The operation then continues on to step 760 as described previously.

Figure 8:
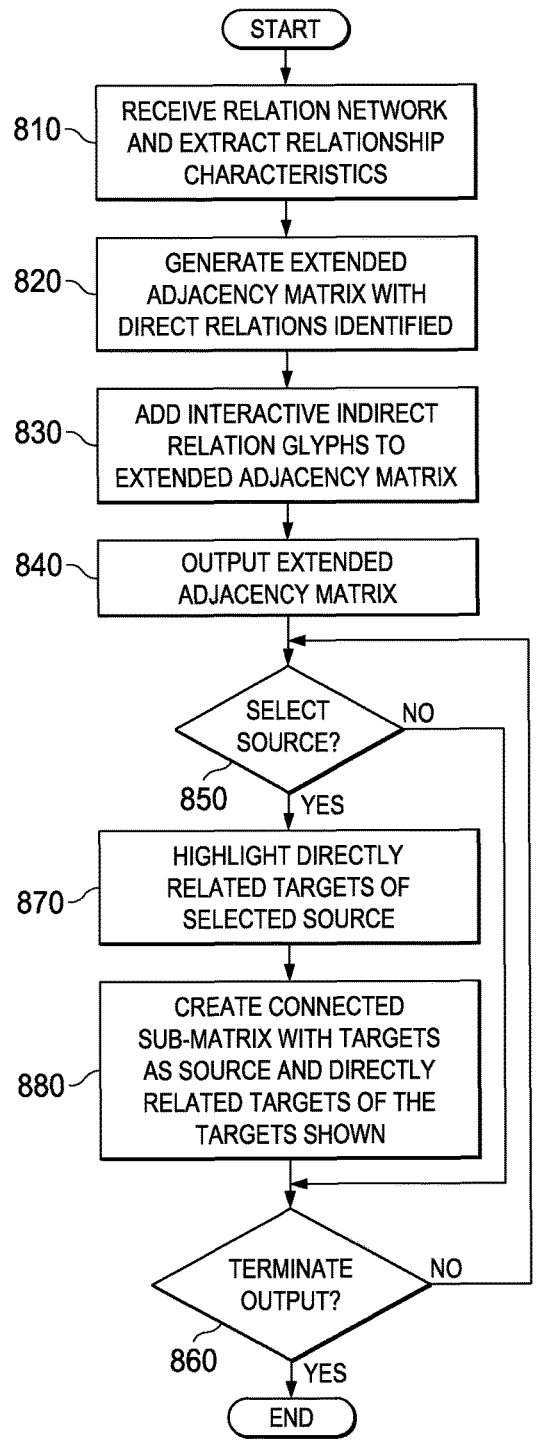
FIG. 8 is a flowchart outlining an example operation for generating an extended adjacency matrix having a connected sub-matrix in accordance with one illustrative embodiment.

FIG. 8 is a flowchart outlining an example operation for generating an extended adjacency matrix having a connected sub-matrix in accordance with one illustrative embodiment. As with the operation outlined in FIG. 7, the operation outlined in FIG. 8 may be implemented using the logic of the relation network visualization and interaction engine 120 in FIG. 1, for example, utilizing the generated graphical user interface 140 which may be output to a user via a computing device, e.g., a client computing device 110-114 in FIG. 1.

As shown in FIG. 8, the operation starts by receiving a relation network and extracting relationship characteristics from the relation network (step 810) similar to step 710 in FIG. 7. The extended adjacency matrix is generated with the direct relations identified based on the results of the extraction of the relationship characteristics (step 820). Thereafter, interactive indirect relation glyphs are added to the extended adjacency matrix in the portions of the body of the matrix corresponding to the entities connected by the indirect relations identified through the extraction of the relationship characteristics (step 830). The resulting extended adjacency matrix is then output as part of a GUI representing the relation network as the extended adjacency matrix (step 840).

A determination is made as to whether a source entity is selected in the extended adjacency matrix (step 850). If not, the operation then determines if the output of the relation network as the extended adjacency matrix is to be terminated (step 860). If so, the operation terminates. If not, the operation returns to step 850 and continues to monitor for the selection of a source entity. If a source entity is selected by a user, then the directly related target entities in the matrix are highlighted (step 870). This highlighting may be done such as shown in FIG. 6, for example. In the depicted example, the sub-matrix for these target entities is then automatically generated (step 880) although in some illustrative embodiments this step may be performed in response to a user input requesting such a sub-matrix be generated. The operation then continues to step 860. It should be appreciated that when the operation continues to step 850 as a result of the output not being terminated, that the selected source may be a source in a sub-matrix such that multiple levels of connected sub-matrices may be generated through iterations of steps 850-880.

Thus, the illustrative embodiments provide mechanisms for providing a multi-attribute relation network visualization and interaction interface which utilizes a grid-based method of visualization. The interface of the illustrative embodiments provides an intuitive and interactive representation of the relation network that minimizes clutter of the representation while allowing for the representation of the details of indirect relations between entities in the relation network. The improved operation of the computing devices by the implementation of the illustrative embodiments facilitates functionality for improving the conveyance of knowledge to users for complex relationships of networks of entities.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory comprising instructions that specifically configure the processor to implement a relation network visualization and interaction engine, for generating an extended adjacency matrix representation of a relation network, the method comprising:

receiving, by the relation network visualization and interaction engine implemented by the processor, a relation network data structure;

generating, by the relation network visualization and interaction engine, an adjacency matrix graphical representation of the relation network based on analysis of the relation network data structure;

extending, by the relation network visualization and interaction engine, the adjacency matrix graphical representation by adding an indirect relation glyph, for an indirect relation in the relation network, to the adjacency matrix graphical representation in association with representations of a source entity and a target entity that correspond to the indirect relation, to thereby generate an extended adjacency matrix graphical representation; and outputting, by the relation network visualization and interaction engine, the extended adjacency matrix graphical representation in a visual manner on a computing device, wherein the indirect relation glyph is rendered in the extended adjacency matrix graphical representation such that it is selectable by a user, and wherein the method comprises:

receiving a user input to select the indirect relation glyph;

generating a detailed representation of the indirect relation glyph in response to the user input selecting the indirect relation glyph; and outputting the detailed representation of the indirect relation glyph, and wherein:

the indirect relation glyph comprises a graphical characteristic that graphically represents a type of indirect relationship between the source entity and the target entity, and wherein at least two indirect relation glyphs in the extended adjacency matrix graphical representation have different graphical characteristics representing different types of indirect relationships; and the detailed representation of the indirect relation glyph comprises detailed information regarding each of a plurality of direct relations between entities that together constitute the indirect relation, wherein the indirect relation glyph is rendered in the extended adjacency matrix graphical representation in an entry of the extended adjacency matrix graphical representation corresponding to an intersection of the source entity and the target entity, and wherein the indirect relation glyph further graphically represents a number of direct relations within the indirect relation.

2. The method of claim 1, wherein the detailed representation of the indirect relation glyph is a representation having a graphical representation of each intermediate entity along a path of direct relations from the source entity to the target entity, and graphical representations of links between source entity, each intermediate entity, and the target entity that having direct relations along the path of direct relations, wherein the graphical representations of each intermediate entity comprise graphical objects corresponding to types of the intermediate entities and the graphical representations of each of the links comprise graphical objects corresponding to types of the links.

3. The method of claim 1, wherein the adjacency matrix graphical representation comprises headers, and wherein the headers have graphical representations of different categories of entities, and wherein the headers further comprise glyphs representing types of the source entity and the target entity located in association with the graphical representations of the different categories based on characteristics of the source entity and target entity.

4. The method of claim 1, further comprising:
receiving a user input to initiate filtering of the extended adjacency matrix representation to filter out combinations of source entity and target entities that do not have direct relations or indirect relations from the extended adjacency matrix representation; and
processing the extended adjacency matrix representation to modify the extended adjacency matrix representation to remove combinations of source entity and target entities that do not have direct relations or indirect relations from the extended adjacency matrix representation.

5. The method of claim 1, further comprising:
receiving a user input selecting a representation of a first entity in the extended adjacency matrix representation;
automatically selecting, in the extended adjacency matrix representation, one or more target entities having a relationship with the source entity; and
generating and outputting a sub-matrix representation corresponding to the automatically selected one or more target entities, wherein the sub-matrix representation identifies other entities with which the automatically selected one or more target entities have a relation.

6. The method of claim 1, wherein glyphs for one or more entities in the extended adjacency matrix representation comprise multi-level glyphs in which various graphical representations representing a plurality of characteristics of an entity are superimposed over each other to generate a multi-level glyph graphically representing the plurality of characteristics of the entity.

7. The method of claim 1, wherein the source entity and the target entity are genes and the extended adjacency matrix representation is a representation of protein genomic relations.

8. The method of claim 1, wherein the indirect relation glyph comprises a plurality of graphical representations in a nested format, wherein each graphical representation in the nested format represents a different direct relationship between entities that together comprise the indirect relationship.

9. A computer program product comprising a computer readable storage medium having a computer readable program stored therein, wherein the computer readable program, when executed on a computing device, causes the computing device to implement a relation network visualization and interaction engine which generates an extended adjacency matrix representation of a relation network at least by:

receiving a relation network data structure;
generating an adjacency matrix graphical representation of the relation network based on analysis of the relation network data structure;
extending the adjacency matrix graphical representation by adding an indirect relation glyph, for an indirect relation in the relation network, to the adjacency matrix graphical representation in association with representations of a source entity and a target entity that correspond to the indirect relation, to thereby generate an extended adjacency matrix graphical representation; and
outputting the extended adjacency matrix graphical representation in a visual manner on a computing device, wherein the indirect relation glyph is rendered in the extended adjacency matrix graphical representation such that it is selectable by a user, and wherein the relation network visualization and interaction engine further generates the extended adjacency matrix representation of the relation network at least by:
receiving a user input to select the indirect relation glyph;
generating a detailed representation of the indirect relation glyph in response to the user input selecting the indirect relation glyph; and
outputting the detailed representation of the indirect relation glyph, wherein:
the indirect relation glyph comprises a graphical characteristic that graphically represents a type of indirect relationship between the source entity and the target entity, and wherein at least two indirect relation glyphs in the extended adjacency matrix graphical representation have different graphical characteristics representing different types of indirect relationships; and
the detailed representation of the indirect relation glyph comprises detailed information regarding each of a plurality of direct relations between entities that together constitute the indirect relation, wherein the indirect relation glyph is rendered in the extended adjacency matrix graphical representation in an entry of the extended adjacency matrix graphical representation corresponding to an intersection of the source entity and the target entity, and wherein the indirect relation glyph further graphically represents a number of direct relations within the indirect relation.

10. The computer program product of claim 9, wherein the detailed representation of the indirect relation glyph is a representation having a graphical representation of each intermediate entity along a path of direct relations from the source entity to the target entity, and graphical representations of links between source entity, each intermediate entity, and the target entity that having direct relations along the path of direct relations, wherein the graphical representations of each intermediate entity comprise graphical objects corresponding to types of the intermediate entities and the graphical representations of each of the links comprise graphical objects corresponding to types of the links.

11. The computer program product of claim 9, wherein the adjacency matrix graphical representation comprises headers, and wherein the headers have graphical representations of different categories of entities, and wherein the headers further comprise glyphs representing types of the source entity and the target entity located in association with the graphical representations of the different categories based on characteristics of the source entity and target entity.

12. The computer program product of claim 9, wherein the relation network visualization and interaction engine further generates the extended adjacency matrix representation of a relation network at least by:
  receiving a user input to initiate filtering of the extended adjacency matrix representation to filter out combinations of source entity and target entities that do not have direct relations or indirect relations from the extended adjacency matrix representation; and
  processing the extended adjacency matrix representation to modify the extended adjacency matrix representation to remove combinations of source entity and target entities that do not have direct relations or indirect relations from the extended adjacency matrix representation.

13. The computer program product of claim 9, wherein the relation network visualization and interaction engine further generates the extended adjacency matrix representation of a relation network at least by:
  receiving a user input selecting a representation of a first entity in the extended adjacency matrix representation;
  automatically selecting, in the extended adjacency matrix representation, one or more target entities having a relationship with the source entity; and
  generating and outputting a sub-matrix representation corresponding to the automatically selected one or more target entities, wherein the sub-matrix representation identifies other entities with which the automatically selected one or more target entities have a relation.

14. The computer program product of claim 9, wherein glyphs for one or more entities in the extended adjacency matrix representation comprise multi-level glyphs in which various graphical representations representing a plurality of characteristics of an entity are superimposed over each other to generate a multi-level glyph graphically representing the plurality of characteristics of the entity.

15. The computer program product of claim 9, wherein the indirect relation glyph comprises a plurality of graphical representations in a nested format, wherein each graphical representation in the nested format represents a different direct relationship between entities that together comprise the indirect relationship.

16. An apparatus comprising:
  a processor; and
  a memory coupled to the processor, wherein the memory comprises instructions which, when executed by the processor, cause the processor to implement a relation network visualization and interaction engine which generates an extended adjacency matrix representation of a relation network at least by:
  receiving a relation network data structure;
  generating an adjacency matrix graphical representation of the relation network based on analysis of the relation network data structure;
  extending the adjacency matrix graphical representation by adding an indirect relation glyph, for an indirect relation in the relation network, to the adjacency matrix graphical representation in association with representations of a source entity and a target entity that correspond to the indirect relation, to thereby generate an extended adjacency matrix graphical representation; and
  outputting the extended adjacency matrix graphical representation in a visual manner on a computing device, wherein the indirect relation glyph is rendered in the extended adjacency matrix graphical representation such that it is selectable by a user, and wherein the relation network visualization and interaction engine further generates the extended adjacency matrix representation of the relation network at least by:
  receiving a user input to select the indirect relation glyph;
  generating a detailed representation of the indirect relation glyph in response to the user input selecting the indirect relation glyph; and
  outputting the detailed representation of the indirect relation glyph, wherein:
    the indirect relation glyph comprises a graphical characteristic that graphically represents a type of indirect relationship between the source entity and the target entity, and wherein at least two indirect relation glyphs in the extended adjacency matrix graphical representation have different graphical characteristics representing different types of indirect relationships; and
    the detailed representation of the indirect relation glyph comprises detailed information regarding each of a plurality of direct relations between entities that together constitute the indirect relation, wherein the indirect relation glyph is rendered in the extended adjacency matrix graphical representation in an entry of the extended adjacency matrix graphical representation corresponding to an intersection of the source entity and the target entity, and wherein the indirect relation glyph further graphically represents a number of direct relations within the indirect relation.

* * * * *